US009046915B2

(12) United States Patent
Zheng et al.

(10) Patent No.: US 9,046,915 B2
(45) Date of Patent: Jun. 2, 2015

(54) CIRCUIT AND METHOD FOR INITIALIZING A COMPUTER SYSTEM

(75) Inventors: Xiao Gang Zheng, Sunnyvale, CA (US); Ming L. So, Danville, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 467 days.

(21) Appl. No.: 13/405,957

(22) Filed: Feb. 27, 2012

(65) Prior Publication Data

US 2013/0227196 A1   Aug. 29, 2013

(51) Int. Cl.
| G06F 12/00 | (2006.01) |
| G06F 3/00 | (2006.01) |
| G06F 13/36 | (2006.01) |
| G06F 9/445 | (2006.01) |
| G06F 9/44 | (2006.01) |

(52) U.S. Cl.
CPC ... *G06F 3/00* (2013.01); *G06F 13/36* (2013.01); *G06F 9/445* (2013.01); *G06F 8/665* (2013.01); *G06F 9/4411* (2013.01)

(58) Field of Classification Search
CPC ....... G06F 3/00; G06F 11/1068; G06F 12/00; G06F 12/0246; G06F 13/36; G06F 2212/2022; G06F 12/1027; G06F 21/71; G06F 12/023; G06F 12/0802; G06F 12/10; G06F 21/85; G06F 9/4411; G06F 11/3485; G06F 12/06
USPC ............ 711/103, 202, E12.008, E12.017, 711/E12.001, E12.019; 710/306, 10
See application file for complete search history.

(56) References Cited

U.S. PATENT DOCUMENTS

| 4,688,172 | A | * | 8/1987 | Wright ......................... 713/1 |
| 5,535,419 | A | * | 7/1996 | O'Brien ..................... 710/36 |
| 5,644,700 | A | * | 7/1997 | Dickson et al. ............. 714/5.11 |
| 5,924,120 | A | * | 7/1999 | Razdan et al. ............... 711/141 |
| 5,930,738 | A | * | 7/1999 | Jones ......................... 702/132 |
| 6,195,749 | B1 | | 2/2001 | Gulick |
| 6,484,247 | B1 | * | 11/2002 | Gendron et al. ............. 711/170 |
| 7,676,640 | B2 | * | 3/2010 | Chow et al. .................. 711/162 |
| 8,352,721 | B1 | * | 1/2013 | Righi et al. ..................... 713/2 |
| 8,381,264 | B1 | * | 2/2013 | Corddry et al. ................. 726/3 |
| 8,558,839 | B1 | * | 10/2013 | Wyatt ......................... 345/502 |
| 2003/0090937 | A1 | * | 5/2003 | Chen ........................ 365/185.08 |

(Continued)

OTHER PUBLICATIONS

Advanced Micro Devices, Inc.; "AMD SB710 Databook"; Technical Reference Manual; 2009; 45215_sb710_ds_pub; Rev. 1.60; 88 Pages; Advanced Micro Devices, Inc., One AMD Place, Sunnyvale, California 94085.

(Continued)

*Primary Examiner* — Sanjiv Shah
*Assistant Examiner* — Edward Waddy, Jr.
(74) *Attorney, Agent, or Firm* — Polansky & Associates, P.L.L.C.; Paul J. Polansky

(57) ABSTRACT

A circuit for use in a computing system including a bus interface unit and an autoload controller. The autoload controller has an input to receive an initialization signal. In response to receiving the initialization signal, the autoload controller searches for a signature using the bus interface unit and, in response to finding the signature at a signature address, loads a plurality of base addresses corresponding to a plurality of controllers from memory locations having a predetermined relationship to the address, and provides the plurality of base addresses to a control output thereof.

21 Claims, 6 Drawing Sheets

(56) References Cited

U.S. PATENT DOCUMENTS

| | | | |
|---|---|---|---|
| 2003/0217255 A1* | 11/2003 | Wyatt | 713/100 |
| 2004/0129952 A1* | 7/2004 | Griesmer et al. | 257/202 |
| 2004/0207630 A1* | 10/2004 | Moreton et al. | 345/543 |
| 2005/0050314 A1* | 3/2005 | Ohkita et al. | 713/2 |
| 2005/0160217 A1* | 7/2005 | Gonzalez et al. | 711/6 |
| 2006/0085629 A1* | 4/2006 | Swanson et al. | 713/1 |
| 2006/0288153 A1* | 12/2006 | Tanaka et al. | 711/103 |
| 2007/0011522 A1* | 1/2007 | Denniston | 714/724 |
| 2008/0288691 A1* | 11/2008 | Bie et al. | 710/200 |
| 2009/0067211 A1* | 3/2009 | Rahman | 365/96 |
| 2011/0040795 A1* | 2/2011 | Gordon et al. | 707/792 |
| 2011/0154085 A1* | 6/2011 | Rickard | 713/340 |
| 2011/0252164 A1* | 10/2011 | Grundy et al. | 710/52 |
| 2012/0011340 A1* | 1/2012 | Flynn et al. | 711/171 |
| 2012/0191899 A1* | 7/2012 | Zbiciak et al. | 711/103 |

OTHER PUBLICATIONS

Advanced Micro Devices, Inc.; "AMD SB800-Series Southbridges BIOS Developer's Guide"; Technical Reference Manual; 2011; 45483_sb800_bdg_pub_3.02; Rev. 3.02; 50 Pages; Advanced Micro Devices, Inc., One AMD Place, Sunnyvale, California 94085.

* cited by examiner

CIRCUIT AND METHOD FOR INITIALIZING A COMPUTER SYSTEM

FIELD

This disclosure relates generally to computer systems, and more particularly to a circuit for initializing a computer system.

BACKGROUND

During the initialization phase of a computer system, specific firmware files and the basic input/output system (BIOS) code are accessed from non-volatile memories, such as a low pin count (LPC) or simple peripheral interface (SPI) flash memories. One known technique is for each of the firmware files and the BIOS code to be stored in a separate memory and accessed separately by a corresponding controller. This technique results in a computer system that requires additional memory chips and thus has a higher cost. An alternative technique is to store all of the firmware files and the BIOS code in a single memory and to incorporate a memory controller to manage memory requests to the single memory. However, the size of the firmware and the BIOS are largely dependent on the implementation of the respective controllers and vary widely. Therefore during the initialization phase, the BIOS typically programs the memory controller with memory partition data. However, this technique requires the BIOS be read from memory before the other controllers can access their firmware and thus slows system initialization.

BRIEF DESCRIPTION OF THE DRAWINGS

In the following description, the use of the same reference numerals in different drawings indicates similar or identical items.

DETAILED DESCRIPTION OF ILLUSTRATIVE EMBODIMENTS

Figure 1:
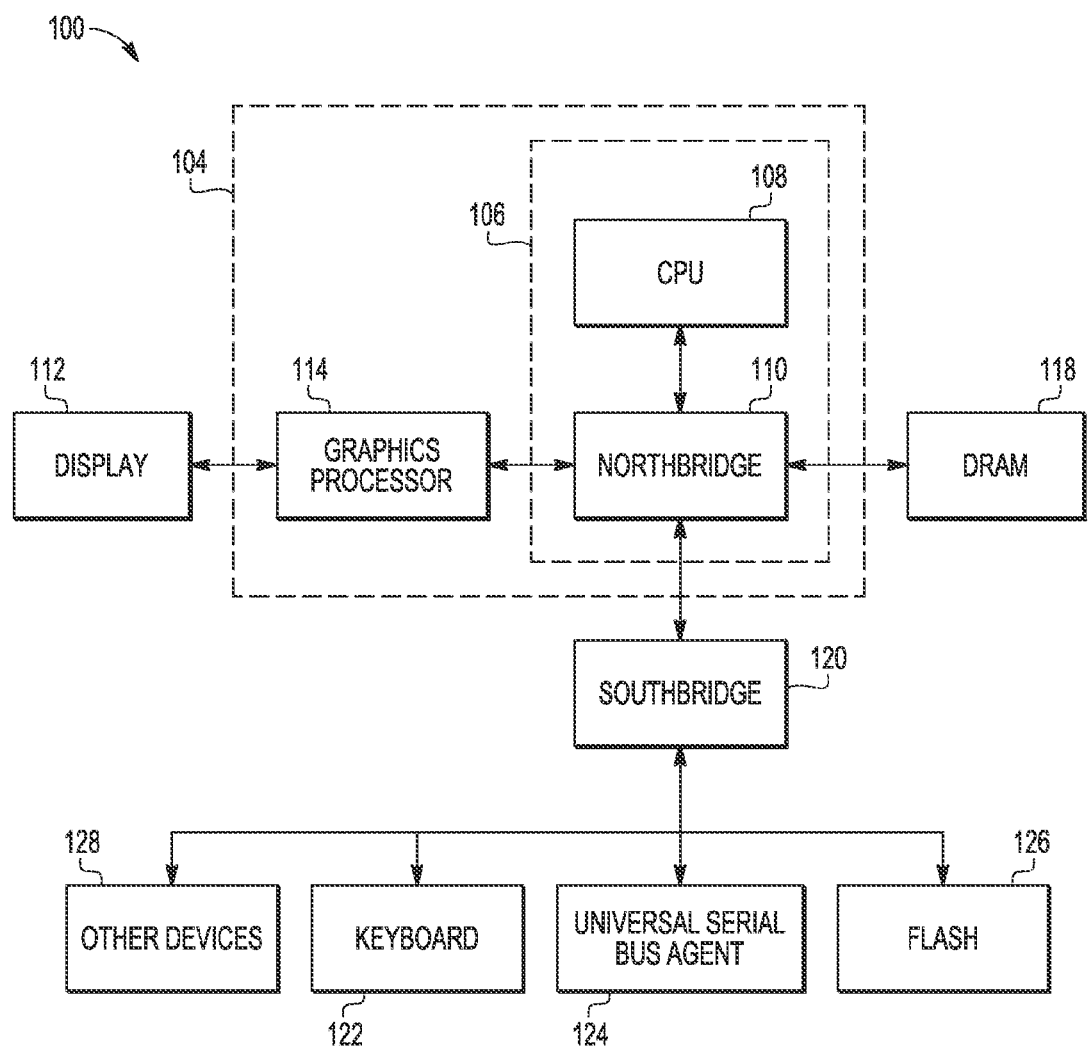
FIG. 1 illustrates a block diagram of a computing system according to an embodiment of the present invention.

FIG. 1 illustrates a block diagram of a computer system 100 according to an embodiment of the present invention. Computer system 100 can be any electronic device that is capable of executing processor-readable instructions, including a personal digital assistant (PDA), a smart phone or cell phone, a tablet computer with a touch screen display, a notebook or desktop computer or other computing devices. Computer system 100 includes a central processing unit (CPU) 108 that is connected to a bridge controller known as a "northbridge" 110. In one embodiment, CPU 108 and northbridge 110 can be combined in a single integrated circuit 106. Northbridge 110 is connected to a graphics processor 114, and in another embodiment, CPU 108, northbridge 110, and Graphics Processor 114 can be combined in a single integrated circuit 104. Graphics processor 114 is also connected to a display 112 for providing visual data to a user. northbridge 110 is further connected to a dynamic random access memory (DRAM) 116 and a bridge controller known as a "southbridge" 120. southbridge 120 is connected to and communicates with a number of devices and peripherals, such as a keyboard 122, a universal serial bus agent (USB agent) 124, a flash memory 126, and a set of other devices 128.

During system initialization, southbridge 120 receives an initialization signal, and in response, autonomously locates base memory addresses that indicate the starting point of various firmware files. For example, each base memory address may be a pointer to the starting location of a memory block used to store firmware for one of the plurality of controllers or the BIOS code. Once southbridge 120 locates the base memory addresses, southbridge 120 utilizes the base memory addresses to map memory access requests from the controllers to corresponding addresses in flash memory 126 at which the respective firmware is stored.

Determining locations of firmware for multiple controllers during the initialization phase of computer system 100 enables southbridge 120 to map the controllers to locations in flash memory 126 autonomously of the BIOS. Further, Southbridge 120 allows the firmware to be stored in any arbitrary location within flash memory 126. This results in easier firmware updates and a relaxation of firmware size constraints typically placed on manufactures of various controllers and the flash memories, as the firmware can be placed at any available location in flash memory 126. Therefore, computer system 100 is a more modular and adaptable. Southbridge 120 allows this autonomous and arbitrary mapping by a special algorithm that searches for a signature and uses the signature to find pointers to starting addresses of the blocks of firmware. Further details of how Southbridge 120 locates the plurality of base memory addresses to provide the benefits listed above will now be described.

Figure 2:
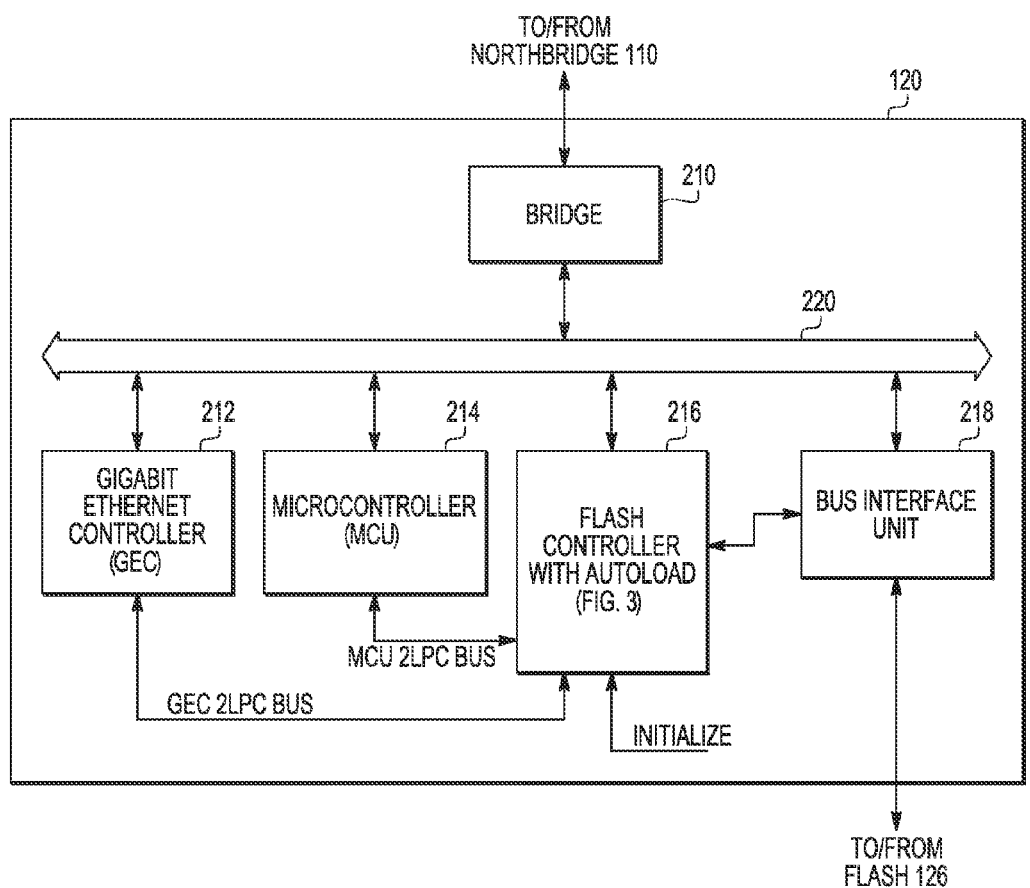
FIG. 2 illustrates a block diagram of the Southbridge of FIG. 1.

FIG. 2 illustrates a block diagram of Southbridge 120 of FIG. 1. southbridge 120 includes a bridge 210, a gigabit Ethernet controller (GEC) 212, a microcontroller (MCU) 214, a flash controller with autoload 216, and a bus interface unit 218 all connected together over an internal bus 220.

Bridge 210 bridges accesses between the bus connecting northbridge 110 and Southbridge 120 (implementing, for example, the PCI Express bus protocol), and internal bus 220 (implementing, for example, a proprietary point-to-point bus protocol).

GEC 212 is a communications peripheral circuit that conforms to the Gigabit Ethernet protocol, and operates according to firmware stored in flash memory 126. GEC 212 fetches packet data to be transmitted from DRAM 116 and stores received data in DRAM 116 using internal bridge 210 and northbridge 110, and accesses its firmware from flash memory 126 using a dedicated bus labeled "GEC2LPC BUS" and flash controller with autoload 216, which in turn uses bus interface unit 218. It communicates with a separate Ethernet physical layer chip through signals not shown in FIG. 2.

MCU 214 is an internal general purpose microcontroller that controls input/output operations of Southbridge 120. In the illustrated embodiment, MCU 214 implements the well-known 8051 family instruction set and has its own dedicated memory and peripherals. MCU 214 also accesses its firmware from flash memory 126 using a dedicated bus labeled "MCU2LPC BUS" and flash controller with autoload 216, which in turn uses bus interface unit 218.

Flash controller with autoload 216 translates normal read and write accesses into flash commands conforming to the common flash interface (CFI). It receives access requests from GEC 212, MCU 214, and bridge 210 and translates these access requests into corresponding bus cycles according to the CFI protocol. As will be described more fully below, flash controller with autoload 216 includes an autoload function by which, in response to receiving a signal labeled "INITIALIZE", it automatically determines the size of flash memory 126 and the location of firmware for GEC 212 and MCU 214. The INITIALIZE signal indicates an initialization following reset, and Southbridge 120 could generate the INITIALIZE signal, for example, in response to a transition from the G3 Advanced Configuration and Power Interface (ACPI) state to the S5 ACPI state, or in alternative embodiments in response to other signals that indicates the initialization period.

Bus interface unit 218 receives access requests through a dedicated connection to flash controller with autoload 216 and performs accesses to external devices such as flash memory 126. In the illustrated embodiment, the external bus is an LPC bus that is a legacy bus with a reduced number of pins compared to modern microprocessor buses. Alternatively bus interface unit 218 could interface to a serial bus such as a simple peripheral interface (SPI) bus or to any of a variety of other known buses.

Southbridge 120 includes many other conventional blocks which are not necessary to understanding the present disclosure and are not illustrated in FIG. 2. Further details of the autoload capability of flash controller with autoload 216 will now be described.

Figure 3:
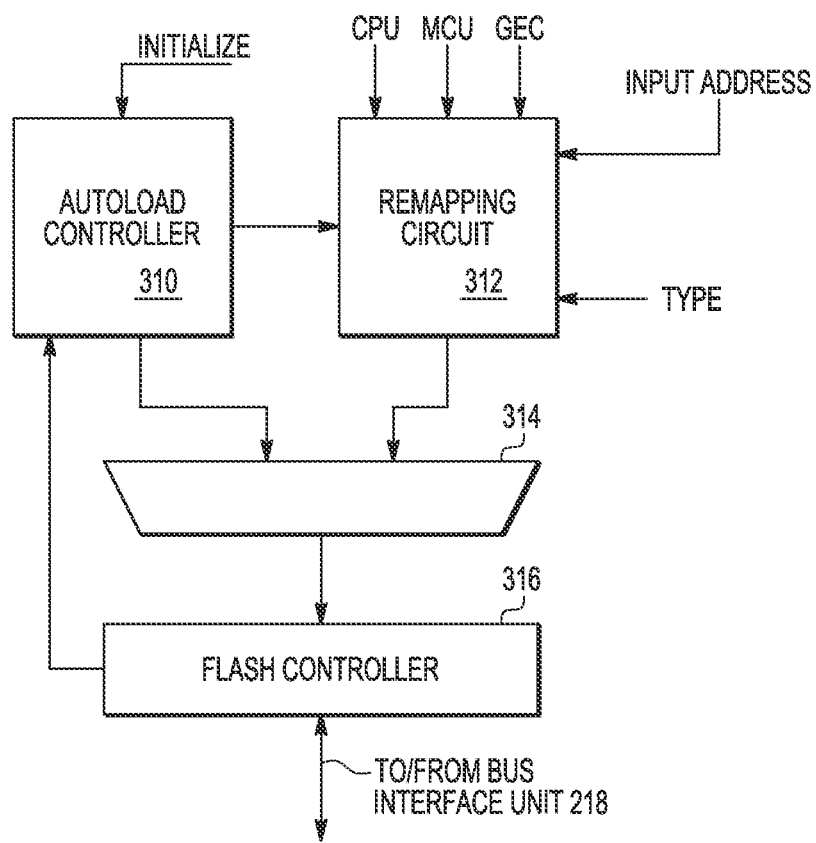
FIG. 3 illustrates a block diagram of the flash controller with autoload of FIG. 2.

FIG. 3 illustrates a block diagram of flash controller with autoload 216 of FIG. 2. Flash controller with autoload 216 includes an autoload controller 310, a remapping circuit 312, a multiplexer (MLA) 314, and a flash controller 316.

Autoload controller 310 has a first input for receiving the INITIALIZE signal, a second input, a first output, and a second output. Remapping circuit 312 has an address input for receiving a signal labeled "INPUT ADDRESS", a type input for receiving a signal labeled "TYPE", control inputs for receiving control signals labeled "CPU", "MCU", and "GEC", an offset input connected to the first output of autoload controller 310, and an output. MLA 314 has a first input connected to the second output of autoload controller 310, a second input connected to the output of remapping circuit 312, and an output. Flash controller 316 has an address input connected to the output of MUX 314, a data output connected to the second input of autoload controller 310, and an input/output terminal connected to bus interface unit 218.

Autoload controller 310 is a state machine that, upon receiving an "INITIALIZE" signal, automatically determines the size of flash memory 126. Autoload controller 310 accesses flash memory 126 through MUX 314 and flash controller 316 to determine memory address locations of firmware corresponding to various controller (such as GEC 212 and MCU 214), and provides the memory address locations to remapping circuit 312 on its first output.

Remapping circuit 312 is a circuit that receives normal read and write memory access requests from various controllers (such as GEC 212 and MCU 214), and translates the memory access to a correct memory address of flash memory 126 by utilizing the base addresses received from autoload controller 312. For example, remapping circuit 312 may translate access requests to the correct memory address of flash memory 126 by adding a base address of a controller, indicated by an active one of the MCU and GEC signals, to the INPUT ADDRESS.

Remapping circuit 312 also has a type input which indicates a type of bus that connects flash controller 316 and flash memory 126. In the illustrated embodiment, the type input is connected to a pin which is tied high or low to indicate that flash memory 126 is either a SPI flash or a LPC flash, but in other embodiments the type input may be set or programmed in other ways.

Flash controller 316 may be a conventional flash controller that manages timing of memory access requests from autoload controller 310 and converts memory access requests from either autoload controller 310 or remapping circuit 312 into appropriate bus cycles to flash memory 126 using bus interface unit 218. Flash controller 316 is connected to MUX 314, which selects the output of autoload controller 310 during an initialization period, and the output of remapping circuit 312 after the end of the initialization period.

Figure 4:
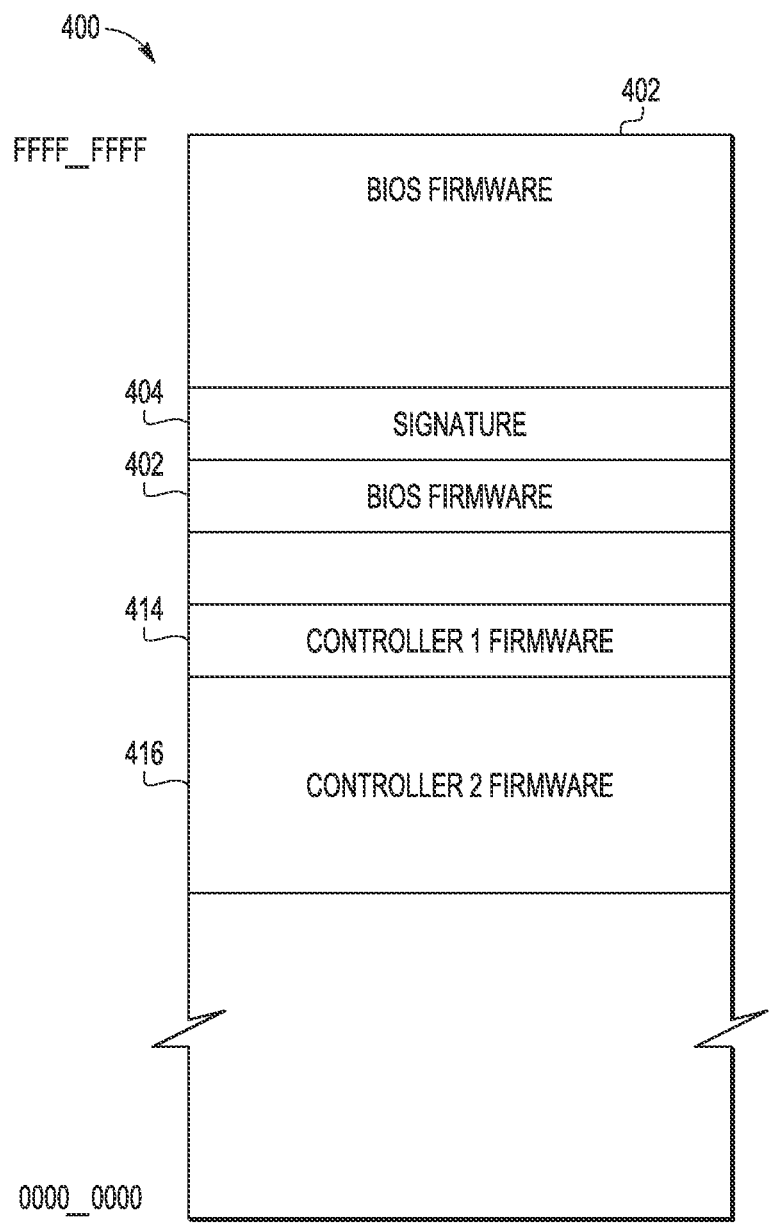
FIG. 4 illustrates a graphical diagram of a memory map according to the prior art.
Figure 5:
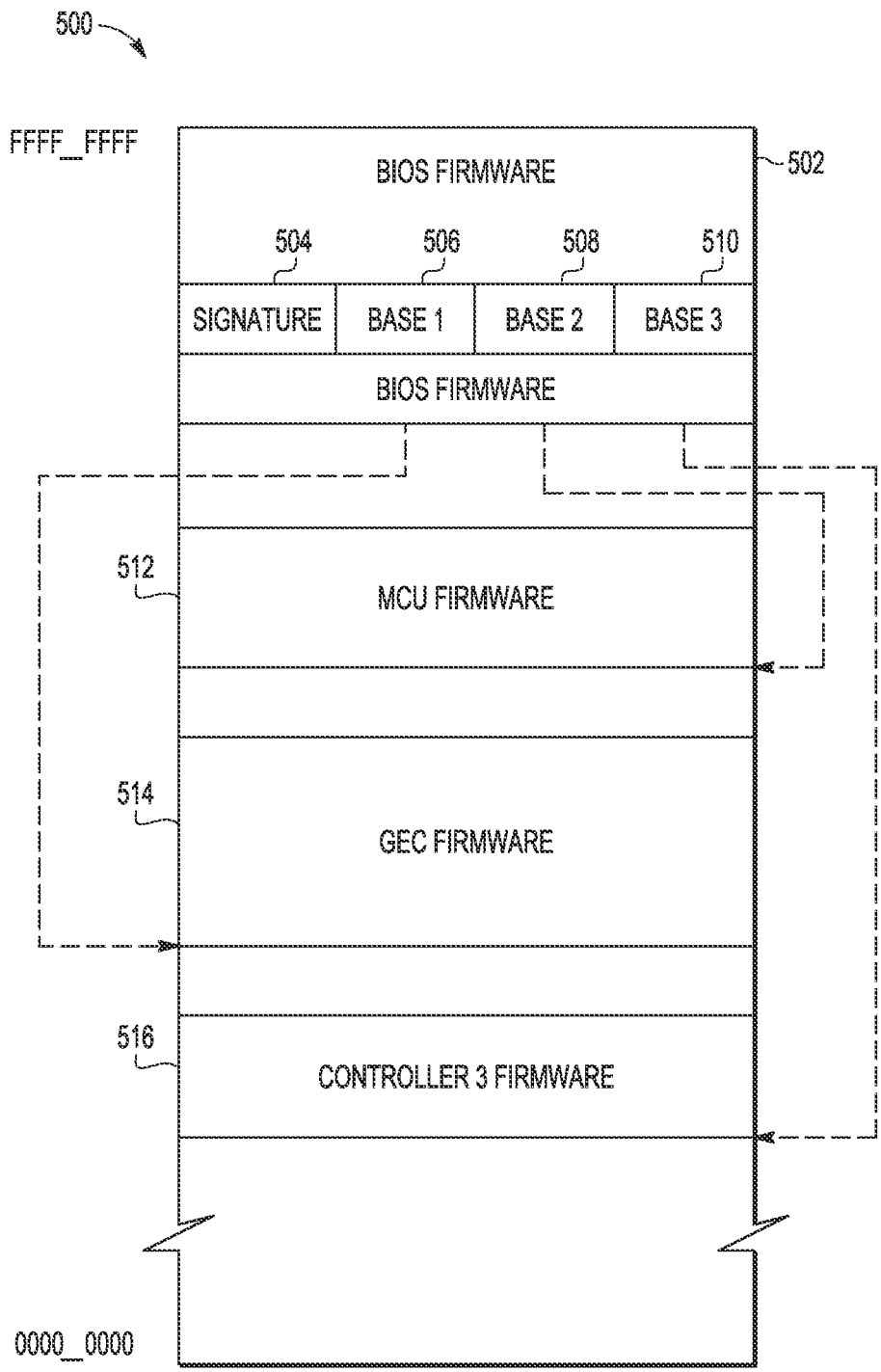
FIG. 5 illustrates a graphical diagram of a memory map useful in understanding the operation of the flash controller of FIG. 3.

Further details of the function of autoload controller 310 will become clear with the comparison of FIG. 4, which describes a typical memory map of a system that does not include autoload controller 310, and FIG. 5, which describes a memory map of the system of FIGS. 1-3.

FIG. 4 illustrates a graphical diagram of a memory map 400 according to the prior art. Memory map 400 is useful for LPC memory and represents a 4 gigabyte (4G) memory space extending from address $0000_0000 to address $FFFF_FFFF. Memory map 400 includes a portion 402 storing firmware for the BIOS labeled "BIOS firmware", a signature 404 within portion 402, a portion 414 storing firmware for a first controller internal to the southbridge labeled "controller 1 firmware", and a portion 416 storing firmware for a second controller labeled "controller 2 firmware". Signature 404 is within the BIOS firmware and is a unique digital code that is offset from the bottom of the flash memory and that is located by the flash controller.

In the system corresponding to memory map 400, the flash controller searches for the signature to determine the size of the memory. In this particular system, the flash controller first assumes that the memory is 512 kilobytes (512K) in size. It searches for the signature by subtracting 512K from 4 gigabytes (4G) and adding the offset. If the contents of this address are equal to the unique digital code, then the flash controller determines that the flash size is 512K. If not, the flash controller looks for the signature at an additional location in the flash memory by subtracting 1M from 40 and adding the offset. The flash controller continues this process until it finds the signature for 2M, 4M, 8M, and 16M sizes. If the flash controller still does not find the signature at the predetermined location of a 16M memory, it assumes the memory size is 512K.

Once the flash controller determines the size of the flash memory, it locates the bottom addresses of firmware for each of controllers 1 and 2. Note however that the BIOS firmware is constrained to be at the top of the memory space since the CPU is in the x86 family and BIOS firmware, portion 402, contains the reset vector at $FFFF_FFF0. Controller 2 firmware is located immediately above the bottom address of the flash memory (equal to 4G minus the flash memory size). This system requires that controller 2 firmware has a predetermined size, for example 128 kilobytes (128K). Controller 1 firmware then would be placed contiguous with the firmware for controller 2 and start at 4G minus the size of the flash memory plus 128K. Using this prior art technique of mapping the firmware for controller 1 and controller 2 at fixed locations with fixed size limits the flexibility of the system by requiring a larger size to be allocated to the controller 2 firmware to accommodate anticipated revisions or alternate versions. Moreover by allowing larger sizes for controllers' firmware than may actually be needed, the system may require the next larger size of flash memory than the size actually needed to store all the firmware, increasing system costs.

FIG. 5 illustrates a graphical diagram of a memory map 500 corresponding to flash memory 126 of FIG. 1. Memory map 500 again illustrates a 4G memory space extending from address $0000_0000 to address $FFFF_FFFF Memory map 500 includes a portion 502 storing the BIOS firmware, a signature 504, a pointer 506 to a first base address labeled "BASE 1", a pointer 508 to a second base address labeled "BASE 2", a pointer 510 to a third base address labeled "BASE 3", a portion 512 storing firmware for MCU 214 labeled "MCU firmware", a portion 514 storing firmware for GEC 212 labeled "GEC firmware", and a portion 516 storing firmware for an optional third controller labeled "controller 3 firmware". Signature 504 is within the BIOS firmware and is a unique digital code offset from the bottom of flash memory 126 and that is located by autoload controller 310. In the illustrated system, the unique digital code is a 32-bit value equal to $55AA_55AA.

In computer system 100, autoload controller 310 searches for the signature to determine the size of the memory. In this particular system, autoload controller 310 first assumes that the memory is 512K in size. It searches for the signature by subtracting 512K from 4G and adding the offset. If the contents of this address are equal to the unique digital code, then autoload controller 310 determines that the flash size is 512K. If not, autoload controller 310 looks for the signature in an additional location in flash memory 126 by subtracting 1M from 4G and adding the offset. Autoload controller 310 continues this process until it finds the signature for binary powers of 1M up to a limit, for example for 1M, 2M, 4M, 8M, and 16M.

Once autoload controller 310 determines the size of the flash memory, it uses BASE 1, BASE 2, and BASE 3 pointers to find the starting addresses to the GEC firmware, the MCU firmware, and the optional controller 3 firmware, respectively. As before, the BIOS firmware is constrained to be at the top of the memory space since the CPU is in the x86 family and BIOS firmware contains the reset vector at $FFFF_13 FFF0.

By locating firmware pointers after signature 504, autoload controller 310 is able to find firmware in flash memory 126 at arbitrary locations and with arbitrary sizes. Thus, computer system 100 can make flash memory 126 smaller in size by sizing flash memory to the actual size required by portions 502, 512, 514, and 516, with no wasted space to accommodate possible firmware variations. If other versions of the firmware cause an increase in size above an available flash memory size, then autoload controller 310 can automatically determine the locations of the new firmware. Autoload controller 310 also accommodates an arbitrary number of controllers, such as optional controller 3, and it should be apparent from the illustration that portions 512, 514, and 516 may be placed in any order and do not need to be contiguous or to start at bottom address of flash memory 126. For example, the GEC firmware is located in memory between the MCU firmware and the controller 3 firmware.

In addition while the signature in the illustrated embodiment is shown within portion 502, the signature may be placed at any known location within the flash memory, for example between portions 514 and 516. Further, the base address pointers need not immediately follow signature 504, but may be in memory locations having a predetermined relationship to the address of signature 504, for example, at the beginnings of 128-bit words.

Further, it should be understood that while the illustrated embodiment depicts a memory map using an LPC communication protocol, computer system 100 may also be implemented using memories implementing other communication protocols, such as the SPI protocol. In the case of SPI type flash, flash controller with autoload 216 uses a 24-bit address and places flash memory 126 at the top of an address space at address $FF_FFFF. In the SPI type system, the operation is similar as to the LPC type system except that the addresses are truncated to 24-bits.

Figure 6:
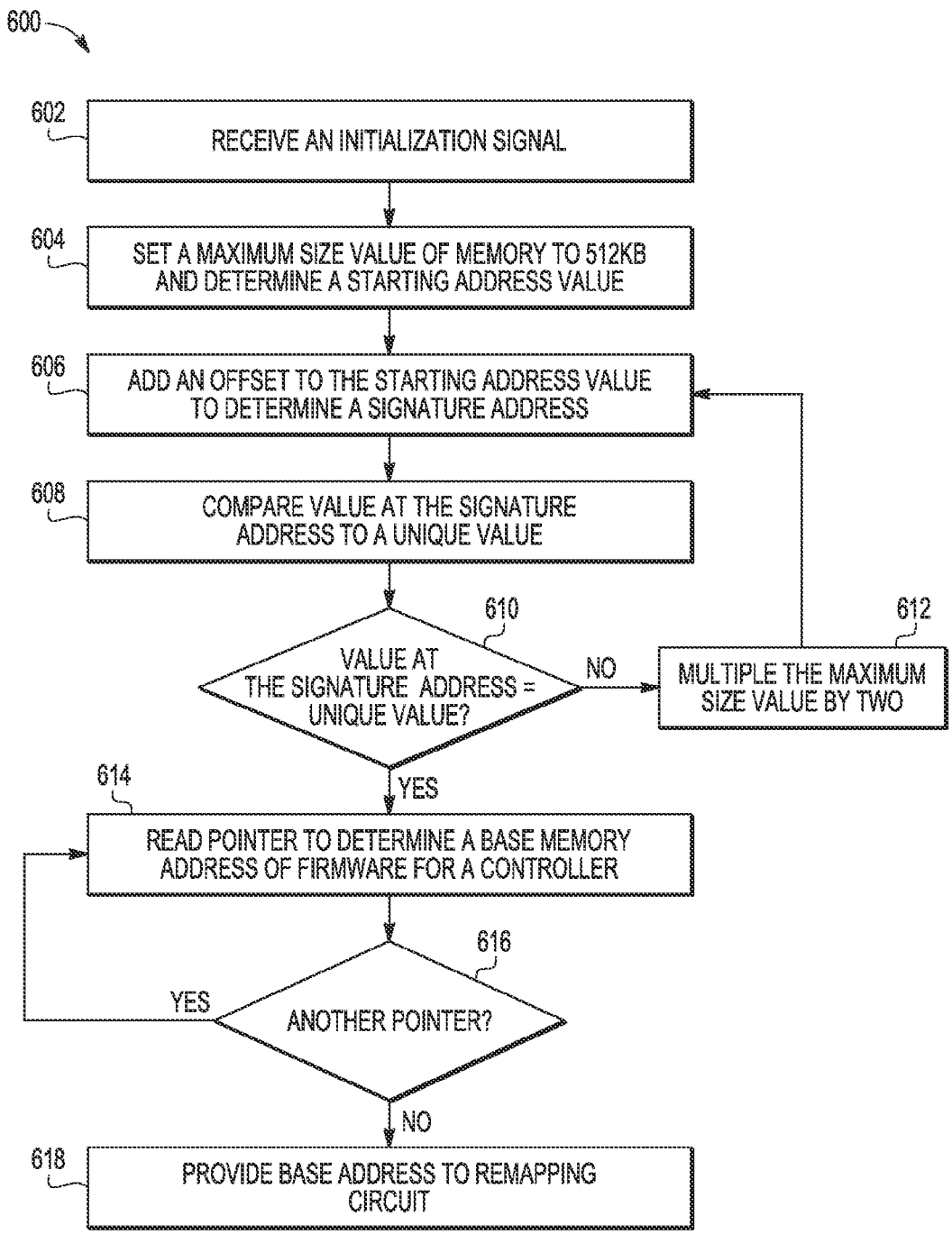
FIG. 6 illustrates a flow diagram of the operation of the autoload controller of FIG. 3.

FIG. 6 illustrates a flow diagram 600 of the operation of autoload controller 310. At 602 autoload controller 310 receives an initialization signal. As noted above, the initialization signal indicates starting from a reset state and may be, for example, a signal that SOUTHBRIDGE 120 generates in response to an ACPI transition from G3 to S5. At 604, autoload controller 310 sets a memory size value to 512K and determines a starting address. Advancing to 606, autoload controller 310 adds an offset to the starting address to determine a signature address and moves to 608 to compare the value at the signature address to a unique value, for example $.AA55_AA55.

If the unique value is not at the signature address, then method 600 proceeds to 612, and autoload controller 310 multiples the memory size value by two and returns to 606. Method 600 continues to search for the unique value until it finds the signature. Method 600 a illustrated in FIG. 6 assumes a signature exists for a supported memory size. For autoload controller 310, however, if the signature is not found an error occurs and flash controller with autoload 216 is unable to translate memory access requests to flash memory 126. In an example, autoload controller 310 checks for the unique value at memory sizes up to a predetermined size N, and autoload controller 310 fails to locate the unique value at any of the signature addresses then autoload controller 310 returns an error. In an alternative embodiment, autoload controller 310 may check for the unique value at memory sizes up to a predetermined size N, and if autoload controller fails to find the unique value at any of the signature addresses then autoload controller 310 returns a default mapping scheme.

If, however, the unique value is at the signature address, then method 600 proceeds to 614 and reads a pointer (i.e. abuse address) at a memory address related to the signature address to determine a base address of firmware for a corresponding controller. Advancing to 616, autoload controller 310 checks to see if there is another pointer for another controller, and if there is, method 600 returns to 614, there is not, method 600 proceeds to 618 and autoload controller provides the base addresses to remapping circuit 312, and flash controller with autoload 216 switches MUX 314 to select the second input thereof and uses remapping circuit 312 for subsequent accesses.

Although the present invention has been described with reference to preferred embodiments, workers skilled in the art will recognize that changes may be made in form and detail without departing from the scope of the invention.

What is claimed is:

1. A circuit for use in a computing system comprising:
an autoload controller having an input to receive an initialization signal;
a bus interface unit coupled to the autoload controller for accessing an external memory; and
wherein the autoload controller, in response to receiving the initialization signal, searches for a signature by reading an address location related to a memory size for each of a plurality of memory sizes to determine a size of the external memory until the signature is found using the bus interface unit, wherein the signature comprises a unique digital code, and in response to finding the signature at a signature address, loads a plurality of base addresses corresponding to a plurality of controllers from memory locations having a predetermined relationship to the signature address.

2. The circuit of claim 1, wherein the autoload controller provides the plurality of base addresses to a control output thereof, in response to loading the plurality of base address.

3. The circuit of claim 1, further comprising:
a remapping circuit responsive to an input address for remapping the input address to a remapped address using a base address of the plurality of base addresses corresponding to a source of the input address.

4. The circuit of claim 3, wherein the remapping circuit stores the plurality of base addresses.

5. The circuit of claim 1, further comprising a southbridge comprising the autoload controller and the bus interface unit.

6. The circuit of claim 5, further comprising:
a northbridge coupled to the southbridge; and
a processing unit coupled to the northbridge.

7. The circuit of claim 6, wherein the processing unit comprises a central processing unit.

8. The circuit of claim 6, wherein the processing unit comprises a graphics processing unit.

9. The circuit of claim 6, wherein the signature address is located within a memory space allocated to a basic input/output system (BIOS).

10. The circuit of claim 1, wherein a bottom address is defined by the memory size and the address location is offset by a predetermined offset from the bottom address.

11. The circuit of claim 1, wherein each of the plurality of memory sizes is equal to a power of two.

12. The circuit of claim 1, wherein each of the plurality of base addresses indicates a memory block containing firmware for a corresponding controller of the plurality of controllers.

13. An integrated circuit comprising:
an internal bus;
a bus bridge having a first port coupled to a first plurality of external terminals, and a second port coupled to the internal bus;
a bus interface unit having a first port, and a second port coupled to a second plurality of external terminals, the bus interface unit for accessing an external memory over the second port;
a remapping circuit having an input for receiving an input address, and an output for providing a remapped address to the first port of the bus interface unit;
an autoload controller coupled to the remapping circuit, the internal bus and the bus interface unit and having an input for receiving an initialization signal; and
wherein the autoload controller, in response to receiving the initialization signal, searches for a signature using the bus interface unit, wherein the signature comprises a unique digital code, and in response to finding the signature at a signature address, provides each of a plurality of base addresses from memory locations having a predetermined relationship to the signature address to the remapping circuit; and
wherein the autoload controller searches for the signature by reading an address location offset by a predetermined offset from a first starting address defining a first memory size of the external memory, and if the address location does not contain the signature, reading further address locations offset by the predetermined offset from each of a plurality of starting addresses defining corresponding memory sizes until the signature is found.

14. The integrated circuit of claim 13, wherein the integrated circuit generates the initialization signal in response to a power state transition.

15. The integrated circuit of claim 13, wherein autoload controller searches for the signature using a flash controller.

16. The integrated circuit of claim 13, further comprising:
a flash controller coupled to the autoload controller and the remapping circuit.

17. A method comprising:
searching a signature address for a signature in response to receiving an initialization signal using a bus interface unit of a computer system, wherein the signature comprises a unique digital code, wherein the searching comprises searching for the signature at an address location offset by a predetermined offset from a first starting address defining a first memory size of an external memory, and if the address location does not contain the signature, reading further address locations offset by the predetermined offset from each of a plurality of starting addresses defining corresponding memory sizes of the external memory until the signature is found; and
reading a first base address indicating a first location of firmware for a first controller in response to finding the signature, the first base address having a predetermined relationship to the signature address.

18. The method of claim 17 further comprising:
remapping an input address using the first base address to provide a remapped address.

19. The method of claim 17, further comprises:
reading a second base address indicating a second location of firmware for a second controller, the second base address having a second predetermined relationship to the signature address.

20. The method of claim 17, wherein the searching further comprises:
comparing a first value stored at the signature address to a predetermined value; and
finding the signature at the signature address if the first value equals the predetermined value.

21. The method of claim 17, wherein the memory sizes are powers of two.

* * * * *

UNITED STATES PATENT AND TRADEMARK OFFICE
CERTIFICATE OF CORRECTION

PATENT NO. : 9,046,915 B2  
APPLICATION NO. : 13/405957  
DATED : June 2, 2015  
INVENTOR(S) : Xiao Gang Zheng et al.

Page 1 of 1

It is certified that error appears in the above-identified patent and that said Letters Patent is hereby corrected as shown below:

In the Specification:

In column 3, line 31, replace "(MLA)" with "(MUX)".

In column 3, line 39, replace "MLA" with "MUX".

In column 3, line 42, replace "output," with "output.".

In column 4, line 40, replace "40" with "4G".

In column 5, line 4, replace "$FFFF_FFFF" with "$FFFF_FFFF.".

In column 5, lines 37-38, replace "$FFFF13FFF0." with "$FFFF_FFF0.".

In column 6, line 18, replace "$.AA55_AA55." with "$AA55_AA55.".

In column 6, line 30, replace "and autoload" with "and if autoload".

In column 6, line 39, replace "abuse" with "a base".

In column 6, line 43, replace "614, there" with "614. If there".

Signed and Sealed this  
Eighth Day of December, 2015

Michelle K. Lee  
*Director of the United States Patent and Trademark Office*